United States Patent
Takaichi et al.

(10) Patent No.: US 9,659,707 B2
(45) Date of Patent: May 23, 2017

(54) MANUFACTURING DEVICE FOR FIELD-POLE MAGNET AND MANUFACTURING METHOD FOR SAME

(71) Applicant: NISSAN MOTOR CO., LTD., Yokohama, Kanagawa (JP)

(72) Inventors: Kazuhiro Takaichi, Yokohama (JP); Kimio Nishimura, Yokohama (JP); Hideki Watanabe, Sagamihara (JP); Takashi Sekikawa, Yokohama (JP); Yasushi Matsushita, Yokohama (JP); Akihisa Hori, Yokohama (JP); Takumi Ohshima, Yokohama (JP); Michito Kishi, Yokohama (JP); Kunitomo Ishiguro, Odawara (JP); Yasuhisa Koike, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 249 days.

(21) Appl. No.: 14/364,202

(22) PCT Filed: Dec. 14, 2012

(86) PCT No.: PCT/JP2012/082574
§ 371 (c)(1),
(2) Date: Jun. 10, 2014

(87) PCT Pub. No.: WO2013/089253
PCT Pub. Date: Jun. 20, 2013

(65) Prior Publication Data
US 2014/0331483 A1    Nov. 13, 2014

(30) Foreign Application Priority Data

Dec. 15, 2011 (JP) ................................. 2011-274272

(51) Int. Cl.
*B23P 19/00* (2006.01)
*H01F 41/02* (2006.01)
(Continued)

(52) U.S. Cl.
CPC ....... *H01F 41/0206* (2013.01); *B23K 26/364* (2015.10); *H01F 41/0253* (2013.01);
(Continued)

(58) Field of Classification Search
CPC ........... H01F 7/145; H01F 7/02; H02K 15/03; H02K 37/14; H02K 2201/06;
(Continued)

(56) References Cited

U.S. PATENT DOCUMENTS 8,497,613 B2 * 7/2013 Nakamura ................ H01F 1/08
29/596

FOREIGN PATENT DOCUMENTS

EP    2 453 453 A1    5/2012
JP    2004-328927 A    11/2004
(Continued)

*Primary Examiner* — Thiem Phan
(74) *Attorney, Agent, or Firm* — Foley & Lardner LLP

(57) ABSTRACT

A one-piece field-pole magnet is manufactured by filling a gap formed between magnetic pieces placed on a plane with an adhesive or resin. During the process, a pushing member applies a pushing force onto each of the magnet pieces in a thickness direction thereof. The pushing member comprises pushing parts each of which pushes each of the magnet pieces, thereby equalizing the pushing forces applied to the respective magnet pieces.

8 Claims, 3 Drawing Sheets

(51) Int. Cl.
*H02K 15/03* (2006.01)
*B23K 26/364* (2014.01)

(52) U.S. Cl.
CPC ........ *H02K 15/03* (2013.01); *Y10T 29/49078* (2015.01); *Y10T 29/53* (2015.01)

(58) Field of Classification Search
CPC ......... Y10T 29/49012; Y10T 29/49009; Y10T 29/49826; Y10S 264/58; B03C 1/0332
USPC ......... 29/732, 596, 598, 607, 608, 609, 729, 29/757, 760
See application file for complete search history.

(56) References Cited

FOREIGN PATENT DOCUMENTS

| | | |
|---|---|---|
| JP | 2009-142081 A | 6/2009 |
| WO | WO 2011/004490 A1 | 1/2011 |
| WO | WO 2011/145433 A1 | 11/2011 |
| WO | WO 2011/158710 A1 | 12/2011 |
| WO | WO 2012/111065 A1 | 8/2012 |
| WO | WO-2014/010363 A1 | 1/2014 |

\* cited by examiner

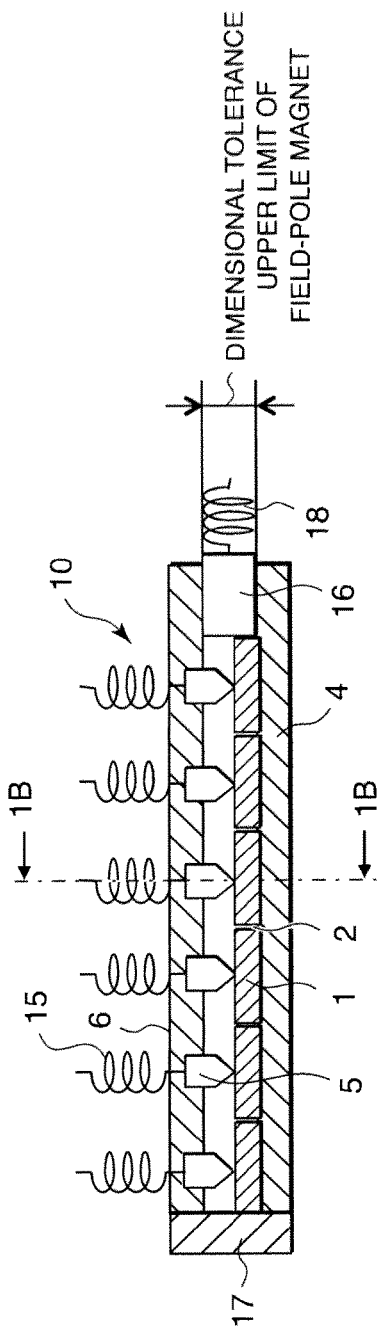
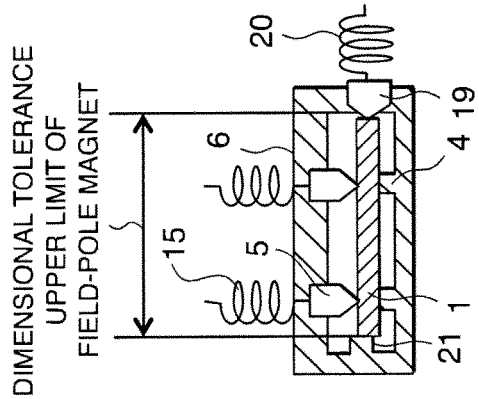

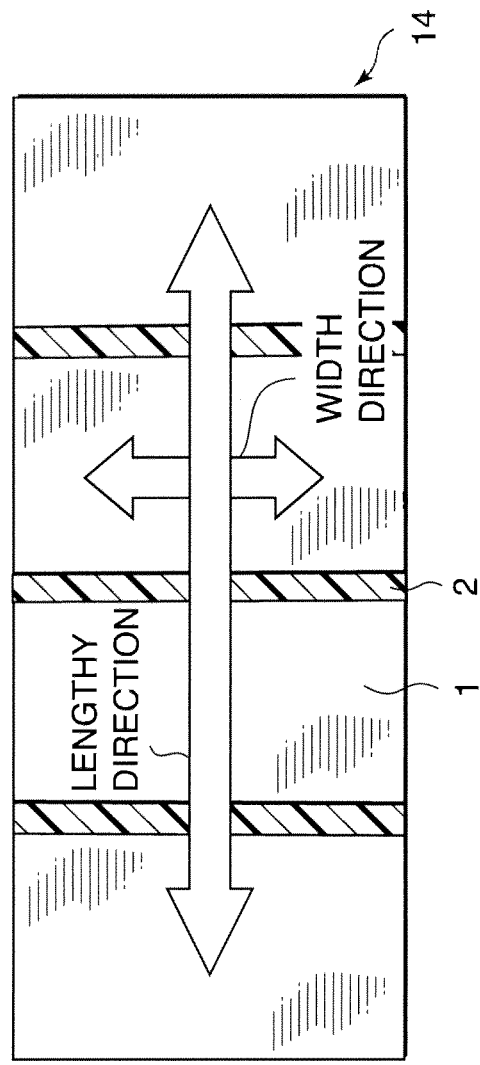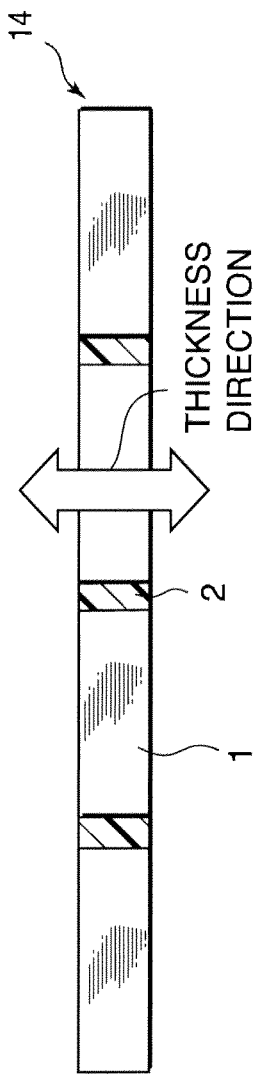
FIG.2A
FIG. 2B

ENLARGED VIEW OF PART A

MANUFACTURING DEVICE FOR FIELD-POLE MAGNET AND MANUFACTURING METHOD FOR SAME

TECHNICAL FIELD

This invention relates to manufacturing of a field-pole magnet of an electric motor or the like.

BACKGROUND ART

A field-pole magnet of an electric motor or the like is constituted by, for example, bonding a plurality of magnet pieces with an adhesive or a resin in order to suppress eddy current.

With regard to manufacturing such a field-pole magnet, JP 2009-142081 A, published by the Japan Patent Office in 2009, discloses manufacturing a base magnet by solidifying a magnet powder for a base magnet in a first stage, and then breaking the resulting base magnet in order to obtain magnet pieces in a second stage. The field-pole magnet is then manufactured by bonding the obtained magnet pieces with an adhesive or a resin.

SUMMARY OF INVENTION

When bonding the magnet pieces with an adhesive or resin, a plurality of the magnet pieces are arranged in a line on a plane so that their broken surfaces face each other with gaps there-between, and then the adhesive or resin is filled into the gaps. Subsequently, the adhesive or resin is solidified while applying pushing forces onto each of the magnet pieces in a direction perpendicular to the plane and a direction parallel to the plane. The solidified adhesive or resin functions as an insulating member between the magnet pieces.

However, if contamination matter becomes interposed between a pushing member that pushes the magnet pieces and the magnet pieces, spaces may be generated between the pushing member and some of the magnet pieces and thus the pushing forces exerted on the plurality of magnet pieces may become unbalanced.

Further, when breaking the base magnet, grooves are formed in advance by laser beam machining or the like at locations to be broken so that the base magnet can be accurately broken at the desired positions. However, burrs are formed at both sides of the grooves during this groove machining. When adhering and fixing the broken magnet pieces, the burrs act in the same way as contamination matter such that spaces may be generated between the pushing member and the magnet pieces and thus the pushing forces exerted on the plurality of magnet pieces may become unbalanced.

If the pushing forces become unbalanced, this may lead to deviations in the positioning of the magnet pieces and malformations of the field-pole magnet that is manufactured.

It is therefore an object of this invention to equalize the pushing forces that a pushing member exerts on the magnet pieces when manufacturing a field-pole magnet using an adhesive or a resin and a pushing member.

In order to achieve the above object, this invention provides a manufacturing device for a field-pole magnet that forms a groove through laser beam machining on one face of a base magnet, breaks the base magnet at the groove to obtain a plurality of magnet pieces, aligns the magnet pieces in a line on a plane via gaps filled with an adhesive or a resin, and applies a pushing force onto the aligned magnet pieces at least in a direction perpendicular to the plane to form a one-piece field-pole magnet. The manufacturing device comprises a support member that supports a face on the opposite side of the aligned magnet pieces to the groove on the plane, and a pushing member that pushes the face of the plurality of magnet pieces on which the groove is formed towards the support member. The pushing member comprises a plurality of pushing parts, each of which pushes each of the plurality of magnet pieces.

The details as well as other features and advantages of this invention are set forth in the remainder of the specification and are shown in the accompanying drawings.

BRIEF DESCRIPTION OF DRAWINGS

FIGS. 1A and 1B are a schematic longitudinal sectional view and a schematic cross-sectional view of a manufacturing device for a field-pole magnet according to a first embodiment of this invention;

FIGS. 2A and 2B are schematic plan view and a schematic side view of a field-pole magnet for explaining each direction of the field-pole magnet formed by adhering a plurality of magnet pieces.

DESCRIPTION OF EMBODIMENTS

Referring to FIGS. 2A and 2B of the drawings, each direction of a field-pole magnet 14 is defined as follows. The field-pole magnet 14 is constituted by aligning a plurality of magnet pieces 1 in one line and adhering them with an adhesive 2. The field-pole magnet 14 has an approximately rectangular planar shape as shown in FIG. 2A. In the following explanations, the direction of the longer side of this rectangle will be referred to as the lengthwise direction, and the direction of the shorter side will be referred to as the width direction. The direction indicated by the arrow marks in the side-surface view of the field-pole magnet 14 shown in FIG. 2B will be referred to as the thickness direction.

Referring to FIGS. 1A and 1B, a manufacturing device for a field-pole magnet according to a first embodiment of this invention forms the one-piece field-pole magnet 14 by adhering the plurality of broken magnet pieces 1 with the adhesive 2 under application of a predetermined pushing force. The magnet pieces 1, which are the materials of the field-pole magnet 14, are manufactured as described below.

Figure 3A:
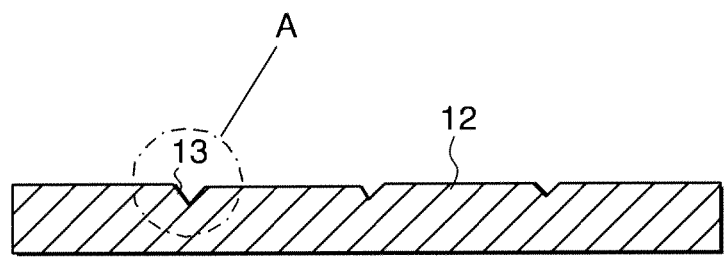
FIGS. 3A and 3B are a vertical cross-section view and an enlarged view of the essential parts of a base magnet for illustrating the formation of a groove in the base magnet and the shape of burrs.
Figure 3B:
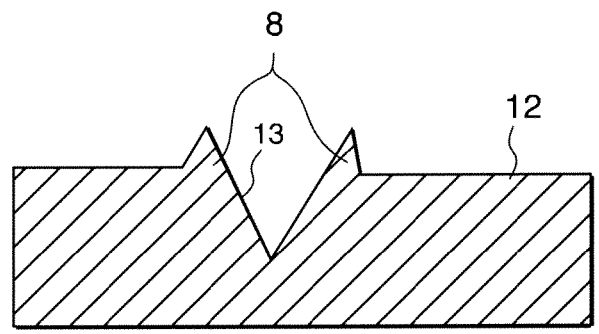

In a first stage, a magnet powder for a base magnet is solidified and then sintered or the like to manufacture a base magnet 12 as shown in FIG. 3A. Grooves 13 for breaking are formed in advance by laser beam machining at positions to be broken. On both sides of each groove 13 that is formed by laser beam machining, burrs 8 appear as shown in FIG. 3B.

In a second stage, the base magnet 12 is broken from the grooves 13 for breaking using a breaking tool. The breaking tool comprises, for example, an upper die and a lower die, and the base magnet 12 is mounted on the lower die with the grooves for breaking facing downwards. On the lower die, two linear protrusions that protrude upwards are formed to support the base magnet 12 on both sides of the groove for breaking. The upper die comprises a blade that pushes the base magnet 12 from the backside of the groove for breaking. Thus, when the blade pushes the base magnet 12 that is supported by the two linear protrusions toward the opposite direction between the two protrusions, the base magnet 12 is broken from the groove for breaking.

With regard to the magnet pieces 1 obtained by breaking the base magnet 12 as described above, the surface on which the burrs 8 exist will be referred to as the top face in the following explanations, and the opposite surface will be referred to as the back face.

Referring again to FIGS. 1A and 1B, the plurality of magnet pieces 1 obtained by breaking are aligned on a plane with their top faces facing upwards and appropriate gaps there-between. The manufacturing device for a field-pole magnet is used in an operation to fill the gaps in this state with the adhesive 2 and fix the magnet pieces 1 to each other. In order to even out the gaps between the adjacent magnet pieces 1, spacers made of insulating material are interposed between the magnet pieces 1 in advance. As the spacers, for example, glass beads, resin beads, insulating cloth, and the like can be used. The adhesive 2 is filled into the gaps so as to surround the spacers. As the adhesive 2, for example, an epoxy adhesive is used. A resin can also be used instead of the adhesive 2.

The manufacturing device for a field-pole magnet comprises a support member 4 that supports the back face of the plurality of magnet pieces 1 on the plane, and a pushing member 10 that pushes the top face of the plurality of magnet pieces 1 towards the support member 4.

The pushing member 10 comprises pushing parts 5 that oppose each magnet piece 1 and a main body 6 that retains the pushing parts 5. The pushing parts 5 push the magnet pieces 1 in a direction perpendicular to the plane on which the magnet pieces 1 are arranged, or in other words in the thickness direction of FIG. 2B. The pushing parts 5 are biased by springs 15, and are constituted by plungers that can be displaced toward the magnet pieces 1. Hydraulic pressure or air pressure can also be applied to the plungers instead of using the springs 15.

In this embodiment, as shown in FIG. 1B, two pushing parts 5 aligned in the width direction push each magnet piece 1. However, it is also possible to arrange one pushing part 5 to push each magnet piece 1, or three or more pushing pieces 5 to push each magnet piece 1.

The support member 4 that supports the plurality of magnet pieces 1 on the plane is formed in the shape of a pair of parallel beams as shown in FIG. 1B. Preferably, the position of the support member 4 is determined so that it conforms to the positions of the two pushing parts 5 aligned in the width direction.

Referring to FIG. 1A, the manufacturing device for a field-pole magnet further comprises a pushing member 16 that applies a pushing force onto the aligned magnet pieces 1 in the lengthwise direction, and a support member 17 that supports the magnet pieces 1 in a direction opposing the pushing member 16. The pushing member 16 is biased by a spring 18, and loads a pushing force in the lengthwise direction onto the aligned magnet pieces 1 toward the support member 17. The pushing member 16 corresponds to a second pushing member and the support member 17 corresponds to a second support member.

The manufacturing device for a field-pole magnet further includes a pushing member 19 that applies a pushing force onto the aligned magnet pieces 1 in the width direction, and a support member 21 that supports the magnet pieces 1 in a direction opposing the pushing member 19. The pushing member 19 is biased by a spring 20, and loads a pushing force in the width direction onto the aligned magnet pieces 1 between itself and the support member 21. The pushing member 19 corresponds to a third pushing member and the support member 21 corresponds to a third support member.

As a result, the manufacturing device for a field-pole magnet accommodates the aligned magnet pieces 1 in a box-shaped space in which the support member 4 and the main body 6, the support member 17 and the pushing member 16, and the support member 21 and the pushing member 19 are formed.

The manufacturing device for a field-pole magnet solidifies the adhesive 2 between the aligned magnet pieces 1 in a state in which it loads pushing forces from three directions as described above. In order to solidify the adhesive 2, the adhesive 2 is heated by a heating device as necessary.

At the point in time of starting the pushing of the magnet pieces 1 by the pushing member 10, there are cases in which contamination matter may be interposed between a certain magnet piece 1 and the pushing member 10. Even if contamination matter is interposed between one magnet piece 1 and the corresponding pushing part 5, the pushing forces applied to the other magnet pieces 1 are not affected because the pushing parts 5 push each magnet piece 1 individually.

According to this manufacturing device for a field-pole magnet, pushing forces can be loaded evenly and in fixed directions onto the plurality of aligned magnet pieces 1. As a result, the pushing forces do not easily become unbalanced and deviations in the magnet pieces 1 due to inclinations do not easily occur. Thus, the precision with regard to the shape and dimensions of the field-pole magnet 14 that is manufactured can be increased.

Further, since each pushing part 5 applies a set pushing force on each individual magnet piece 1, even if there are errors in the dimensions or initial positions of the pushing parts 5, the pushing forces applied to the magnet pieces 1 are not affected by such errors. As a result, when mass producing the manufacturing device for a field-pole magnet, it is not necessary to control the precision with regard to the dimensions and initial positions of the pushing parts 5.

Similarly, even if there are dimensional errors in the thickness direction in the magnet pieces 1 that have been broken, the pushing forces applied to the magnet pieces 1 are not affected by such errors.

As shown in FIG. 1A, the pushing parts 5 are arranged at positions spaced apart from the edges of the magnet pieces 1. Thereby, the pushing position on each magnet piece 1 by each pushing part 5 does not overlap with the burrs 8 shown in FIG. 3B. It is preferable for the pushing parts 5 to push the magnet pieces 1 at positions that avoid the burrs 8 so as to avoid inclinations of the pushing forces caused by the burrs 8.

In this manufacturing device for a field-pole magnet, since the device has a structure in which the pushing parts 5 push each magnet piece 1 individually, the pushing force of each individual pushing part 5 is small compared to a case in which a single pushing part pushes multiple magnet pieces 1. Therefore, in the case that contamination matter becomes jammed between a pushing part 5 and a magnet piece 1, the pushing force that the pushing part 5 exerts on the contamination matter is kept small. As a result, a preferable effect can be anticipated with regard to preventing damage to the top face of the magnet pieces 1 due to the contamination matter receiving a pushing force.

Thermal expansion of the adhesive 2 or the magnet pieces 1 and decreases in the viscosity of the adhesive 2 due to temperature increases change the lengthwise direction dimension of the field-pole magnet 14 that is manufactured. In this manufacturing device for a field-pole magnet, as shown in FIG. 1A, a lengthwise direction pushing force is applied to the aligned magnet pieces 1 by the pushing member 16 and the support member 17. Thus, by loading a lengthwise direction pushing force, the intervals between the magnet pieces 1 defined by the spacers interposed in the gaps there-between can be accurately controlled, and the dimension control precision of the field-pole magnet 14 can be improved. Loading a pushing force in the lengthwise direction achieves a preferable effect in that the adhesive 2 filled in the gaps can be uniformly distributed.

Further, in this device, a pushing force is also applied in the width direction of the field-pole magnet 14 by the pushing member 19 and the support member 21. Thus, the field-pole magnet 14 that is manufactured inside the box-shaped space will not deviate from predetermined standards for the dimensions in all three directions.

This manufacturing device for a field-pole magnet aligns the plurality of magnet pieces 1 on the plane constituted by the support member 4 in a state in which the grooves 13 formed by laser beam machining are oriented towards the pushing member 10. Therefore, the support member 4 supports the smooth back face of each magnet piece 1 on which no burrs 8 exist. Further, as shown in FIG. 1B, the support member 4 is formed in the shape of a pair of parallel beams that contact the magnet pieces 1 at positions opposing the pushing parts 5. Due to this shape and arrangement of the support member 4, all of the pushing forces of the pushing parts 5 can be converted to compressive forces of the magnet pieces 1. However, the support member 4 can also be formed as a smooth surface that contacts the entire back face of all of the plurality of magnet pieces 1.

The contents of Tokugan 2011-274272, with a filing date of Dec. 15, 2011 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the above-described embodiment, laser beam machining is used to form the grooves 13 on the base magnet 12, but the grooves 13 can also be formed using another means such as mechanical machining.

Also, the plurality of magnet pieces are obtained by breaking a base magnet obtained by solidifying a magnet powder, but this invention is not dependent on the process for manufacturing the magnet pieces. This invention is also applicable in cases in which the field-pole magnet is manufactured from magnet pieces manufactured by a method other than breaking. In this case, the grooves 13 would not exist in the magnet pieces that are used and thus the burrs 8 also would not exist, but the pushing forces applied to such magnet pieces can still be equalized by applying this invention.

FIELD OF INDUSTRIAL APPLICABILITY

According to this invention, the pushing member pushes each magnet piece individually. Thus, even if contamination matter becomes interposed between the pushing member and the magnet pieces, the pushing forces can be applied uniformly onto the plurality of magnet pieces. Therefore, when this invention is applied to the manufacture of a field-pole magnet of an electric motor or the like, the manufacturing precision of the magnet pieces can be increased.

The embodiments of this invention in which an exclusive property or privilege is claimed are defined as follows:

The invention claimed is:

1. A manufacturing device for a field-pole magnet configured to form a groove through laser beam machining on one face of a base magnet, break the base magnet at the groove to obtain a plurality of magnet pieces, align the magnet pieces in a line on a plane via a gap filled with adhesive or resin, and apply a pushing force onto the aligned magnet pieces at least in a direction perpendicular to the plane to form a one-piece field pole magnet, the device comprising:
   a support member configured to support a face on an opposite side of the aligned magnet pieces to the groove on the plane; and
   a pushing member configured to push the face of the aligned magnet pieces on which the groove is formed towards the support member;
   wherein the pushing member comprises a plurality of pushing parts each of which is configured to push a respective magnet piece of the aligned magnet pieces, and
   wherein the support member comprises a beam like member configured to support only a part of each of the aligned magnet pieces including a position opposite to a respective pushing part.

2. The manufacturing device according to claim 1, further comprising:
   a second pushing member configured to apply a pushing force on the aligned magnet pieces in a direction parallel to the plane; and
   a second support member configured to support the aligned magnet pieces in an aligned state against the pushing force applied by the second pushing member.

3. The manufacturing device according to claim 2, wherein the aligned magnet pieces are formed into a rectangular planform, and the second pushing member and the second support member are arranged to apply a pushing force and a supporting force along a longitudinal direction of the aligned magnet pieces.

4. The manufacturing device according to claim 3, further comprising:
   a third pushing member configured to apply a pushing force on the aligned magnet pieces in a transverse direction; and
   a third support member configured to support the aligned magnet pieces against the pushing force applied by the third pushing member.

5. The manufacturing device according to claim 1, wherein the pushing parts are disposed at positions that do not overlap, in a direction perpendicular to the plane, a burr that is produced around the groove through the laser beam machining.

6. The manufacturing device according to claim 1, wherein the beam like member comprises a pair of parallel beams.

7. A manufacturing method for a field-pole magnet that forms a groove through a laser beam machining on one face of a base magnet, breaks the base magnet at the groove to obtain a plurality of magnet pieces, aligns the magnet pieces in a line on a plane via a gap filled with adhesive or resin, and applies a pushing force onto the aligned magnet pieces at least in a direction perpendicular to the plane to form a one-piece field pole magnet, the method comprising:
   supporting a face on an opposite side of the aligned magnet pieces to the groove on the plane using a support member;
   pushing the face of the aligned magnet pieces on which the groove is formed towards the support member using a pushing member to apply a pushing force in a direction perpendicular to the plane;

wherein the pushing member comprises a plurality of pushing parts each of which push a respective magnet piece of the aligned magnet pieces, and wherein the support member comprises a beam like member that supports only a part of each of the aligned magnet pieces including a position opposite to a respective pushing part.

8. The manufacturing method according to claim 7, wherein the beam like member comprises a pair of parallel beams.

\* \* \* \* \*